Sept. 20, 1955  R. G. NISLE  2,718,145
SURFACE INDICATING BOTTOM-HOLE PRESSURE MEASURING DEVICE
Filed Sept. 16, 1949  2 Sheets-Sheet 1

INVENTOR.
R. G. NISLE
BY Hudson & Young
by L. Malcolm Oberlin
ATTORNEYS

United States Patent Office 2,718,145
Patented Sept. 20, 1955

2,718,145

SURFACE INDICATING BOTTOM-HOLE PRESSURE MEASURING DEVICE

Robert G. Nisle, Bartlesville, Okla., assignor to Phillips Petroleum Company, a corporation of Delaware Application September 16, 1949, Serial No. 116,152

5 Claims. (Cl. 73—300)

This invention relates to pressure-indicating apparatus, particularly of a type suitable for measuring or recording pressure variations within a well. In another aspect, it relates to a novel transducer for producing an electrical impedance representative of pressure in a well.

Heretofore, considerable difficulties have been encountered in accurately measuring pressures in inaccessible locations, as at the bottom of a bore hole or cased well. In such devices, difficulties arise from the necessity of periodically removing the apparatus for repairs, or for recalibration of the instrument. In addition, previous pressure-measuring devices have ordinarily been quite complicated, with the result that they are difficult to adjust, particularly by inexperienced personnel.

It is an object of this invention to provide a pressure measuring device which may be permanently placed in an inaccessible location, such as a well, without the necessity of periodically removing the instrument for recalibration.

It is a further object to provide a rugged transducer for converting pressure variations into impedance changes representative thereof, this device being suitable for permanent use in a well.

It is a still further object to provide apparatus which is simple in construction, reliable in operation, and which utilizes a minimum number of standard circuit components.

Various other objects, advantages and features of the invention will become apparent from the following detailed description taken in conjunction with the accompanying drawings, in which.

Figure 1:
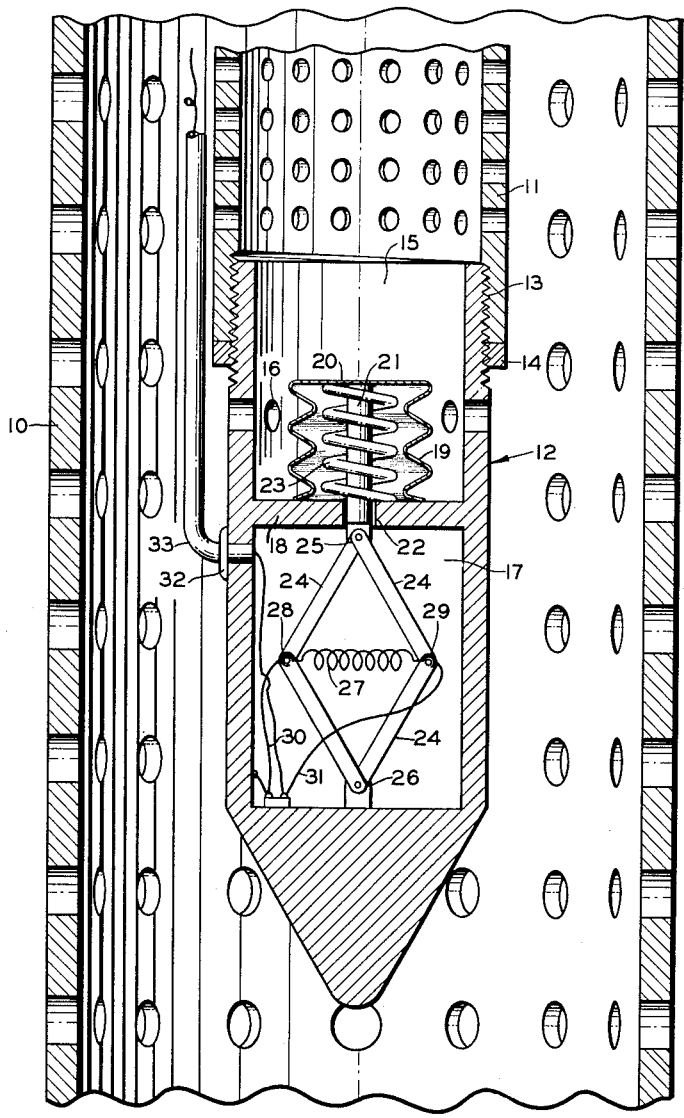
Figure 1 is a vertical sectional view of the transducer of this invention.

Referring now to the drawings in detail, and particularly to Figure 1, I have shown a perforated casing 10 forming a part of a producing oil well, this casing having a perforated tubing 11 mounted therein and preferably concentric therewith. A transducer 12 of novel construction is secured to the lower end of tubing 11, as by threads 13 and a lock ring 14.

The shell of the transducer 12 defines a chamber 15 which communicates, at its upper end, with the interior of tubing 11 and through perforations 16 with the interior of casing 10. The transducer is also shaped to define a chamber 17 which is sealed to prevent entrance of liquids, mud, and gases from the well. The chambers 15, 17 are separated by a wall 18 which carries a bellows 19 having a diaphragm 20 mounted at its upper end. This diaphragm carries a member or rod 21 which protrudes through an opening 22 in wall 18 to the chamber 17. A spring 23 is mounted between diaphragm 20 and wall 18 to urge the bellows toward its extended position. The pressure within the well or bore hole, of course, tends to collapse the bellows and the resulting downward displacement of member 21 is an accurate measure of the well pressure.

Mounted within the chamber 17 are a plurality of pivoted rods or actuating members 24 which are so arranged as to define a parallelogram, the corner 25 of the parallelogram being secured to movable member 21, and the corner 26 being attached to the transducer shell. A coil 27 of resistance wire, such as disclosed in Technical Report 1286 of the National Bureau of Standards and described in Instruments, vol. 21, No. 10, October 1948, page 880, is mounted between corners 28 and 29 of the parallelogram, this coil having terminal leads 30 and 31, lead 30 being grounded and lead 31 extending through a plug 32 and an armored cable 33 to the surface where it is attached to suitable measuring or recording apparatus to be hereinafter described.

It will be apparent that pressure variations within the well change the longitudinal position of member 21, this longitudinal motion being transmitted to the parallelogram 24 and causing a corresponding increase or decrease in the resistance of coil 27. Accordingly, the resistance of the coil is proportional to the well pressure.

The function of the parallelogram 24 is to amplify the relatively small movements of member 21 which produce a relatively large expansion or contraction of resistance coil 27. That is, the parallelogram, in effect, amplifies the small movements of member 21 produced by pressure variations. In some embodiments of the invention, the resistance coil 27 may be replaced by a different type of impedance element whose impedance is varied by the member 21 either with or without the amplification afforded by parallelogram 24, for example, a permeability tuned coil wherein the coil and core are moved with respect to one another.

Figure 2:
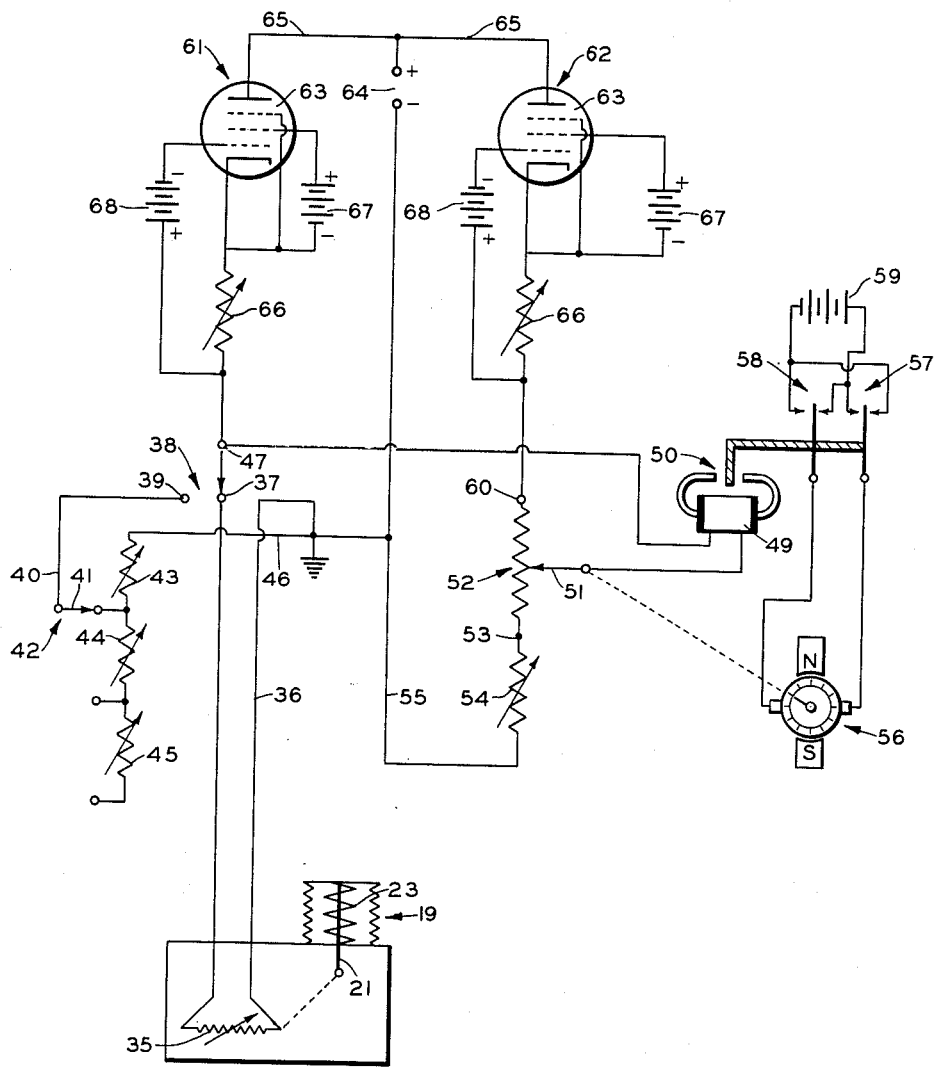
Figure 2 is a schematic diagram of a recording and recalibrating circuit for use with the transducer of Figure 1.

In Figure 2, I have shown the circuit of a device for recording or indicating the impedance produced by the down hole transducer. In this figure, variable resistance 35 represents the resistance coil 27 of Figure 1, and this variable resistance is shown as being mechanically connected to the bellows 19 together with its associated spring 23 and movable member 21.

One terminal of variable resistance 35 is grounded by a lead 36 and its other terminal is connected to a terminal 37 of a switch 38. Terminal 39 of switch 38 is connected by a lead 40 to the arm 41 of a multi-position switch 42. Certain of the fixed terminals of switch 42 are connected to the junctions between a plurality of series connected variable calibrating resistances 43, 44, and 45. One fixed terminal of switch 42 is connected to the free end of variable resistance 45, the free end of variable resistance 43 being grounded by a lead 46. Accordingly, with switch 38 in one position, the contact arm 47 thereof is connected to ground through variable resistance 35 while, with switch 38 in its other position, contact arm 47 is connected to ground through predetermined ones of the calibrating resistances 43, 44, and 45.

The arm 47 is also connected through an energizing winding 49 of a polarized relay 50 to the contact arm 51 of a variable resistance or potentiometer 52, one terminal 53 of which is connected through a variable resistance 54 and a lead 55 to ground. If desired, amplifiers may be connected in circuit with the relay 49 to provide power for operating the relay without disturbing the voltages at terminals 47 and 51. The arm 51 is mechanically connected to the shaft of a reversible motor 56, the windings of which are connected in circuit with contact sets 57, 58 of relay 50 and a battery or other current source 59 in such fashion that movement of the relay armature in one direction actuates contact sets 57, 58 to drive motor 56 in one direction whereas, when the relay armature is moved in the opposite direction, the polarity of the current source is reversed by contact sets 57, 58 so that the motor is driven in the opposite direction. Of course, when the relay armature is positioned in an intermediate position, the current source 59 is disconnected from motor 56 and it does not rotate.

A constant current is supplied to the arm 47 of switch 38 and to a terminal 60 of variable resistance 52. This current is produced by two constant current generators 61 and 62 which are identical so that only one generator need be described in detail. Generator 61 includes a pentode 63 having its anode connected to a battery or other direct current source 64 by a conductor 65. The cathode of tube 63 is connected through a variable resistance 66 to switch arm 47 and the suppressor grid of the tube is connected directly to its cathode. A suitable operating potential is supplied to the screen grid by a battery or other direct current source 67 and a constant negative bias is impressed upon the control grid by a battery or other bias source 68, the battery having its negative terminal connected to the control grid and its positive terminal connected to the switch arm 47. The circuit of constant current generator 62 and the manner in which it is connected to terminal 60 is identical with the circuit of generator 61, corresponding parts being indicated by like reference characters.

Due to the inherent anode current, grid voltage characteristics of the pentodes 63, a constant anode current is produced by these tubes so long as a constant negative bias is applied to their control grids.

In the operation of the circuit of Figure 2, the transducer 35 is positioned at the surface and the arm of switch 38 is moved into contact with terminal 37. If the ohmic value of resistance 35 is greater than the ohmic value of the portion of variable resistor 52 included between contact arm 51 and the grounded terminal of variable resistance 54, which will be hereinafter referred to simply as the ohmic value of variable resistor 52, the voltage drop across resistor 35 is greater than the voltage drop across resistance 52 due to the constant current flowing through both resistors. As a result, a current flows through the winding 49 of relay 50, thus actuating contacts 57, 58 in such fashion as to cause rotation of motor 56 to increase the ohmic value of resistance 52. The described adjustment of resistance 52 is continued until the ohmic value thereof is equal to the ohmic value of variable resistance 35, at which time the voltage drop across resistance 35 is equal to the voltage drop across resistance 52 with the result that the arm 47 is at the same potential as contactor 51. Thereupon, current flow through the winding 39 is terminated, thus de-energizing relay 50 and stopping motor 56.

If the ohmic value of resistance 35 is initially less than the ohmic value of resistance 52, with the result that the voltage drop across resistance 35 is less than the voltage drop across resistance 52, a current flow through the winding 49 in opposite direction with respect to the previously described flow of current. As a result, the armature of relay 50 moves in the opposite direction, thus actuating contacts 57, 58 in such fashion as to drive motor 56 in the opposite direction to decrease the ohmic value of resistance 52. Here again, when the ohmic value of resistance 52 becomes equal to the ohmic value of resistance 35, relay 50 is de-energized and motor 56 is stopped. It will be apparent, therefore, that the relay 50 and motor 56 operate as a servomechanism to maintain the ohmic value of resistance 52 equal to that of resistance 35. The position of contact arm 51 is, accordingly, a direct measure of the ohmic value of resistance 35 so that, if desired, it may be directly connected to an indicating device. Alternatively, the arm 51 may actuate a suitable recorder in a manner familiar to those skilled in the art.

It will be noted that there need not necessarily be a 1 to 1 correspondence between the ohmic values of resistances 35 and 52. By suitable adjustment of resistances 54 and 66, the resistance of unit 52 may be made proportional to the resistance of unit 35 in any desired ratio. Alternatively, by the addition of suitable circuit components, the ohmic value of resistance 52 may be made to vary as any desired function of the ohmic value of resistance 35.

Thus, as stated, with the transducer 35 at the surface and switch arm 47 in contact with terminal 37, the servomechanism operates until the ohmic value of resistance 52 is equal to that of resistance 35. The scale of the recorder indicator is then calibrated to show that the reading of resistance 52 represents atmospheric pressure. Thereupon, the arm of switch 47 is connected to terminal 39, thus substituting calibrating resistance 43 for the resistance 35. Resistor 43 is then adjusted until the same reading is obtained upon potentiometer 52 as was obtained when contact 47 of switch 38 was connected to contact 37 and the pressure on the transducer 35 was atmospheric or some other reference pressure. At this time, therefore, the ohmic value of resistor 43 is equal to the ohmic value of transducer 35 when the latter is at atmospheric pressure. Thereupon, any desired pressure is impressed upon the transducer, such as 1500 pounds per square inch. This may be done either by placing the transducer in a pressure chamber or by lowering it to a predetermined depth in a well. The arm 47 is moved into contact with terminal 37 and the servomechanism operates until resistance 52 has the same ohmic value as resistance 35 at a pressure of 1500 pounds per square inch. This provides a second calibration point upon the recorder or indicator. Thereupon, the arm 47 is moved into contact with terminal 39 and the arm 41 is moved so that it contacts the junction between resistances 44 and 45. As a result, series connected resistances 43, 44 are substituted for resistance 35 in the circuit. Resistance 44 is adjusted until the recorder again reads 1500 pounds per square inch, at which time the combined ohmic value of resistances 43, 44 is equal to the resistance of transducer 35 when it is under a pressure of 1500 pounds per square inch. By following the same procedure, as many additional calibration points as desired may be provided on resistance 52 and the ohmic value of the transducer 35 for each additional calibration point or pressure is stored in the circuit by the provision of additional series calibrating resistors. In the example shown, one additional calibration resistance 45 is provided and this may be used to represent a pressure of 3000 pounds per square inch.

After the instrument has been calibrated in the described manner, the transducer may be permanently mounted within a well, bore hole, or at another inaccessible location. When the circuit is operated, a continuous record or indication of the pressure is provided, since arm 51 is continuously moved to a position where its ohmic value corresponds to the ohmic value of resistance 35 by the servomechanism including relay 50 and motor 56.

The instrument is recalibrated at any desired intervals to compensate for aging of batteries or other circuit components without removing the transducer from its inaccessible location. This is accomplished simply by moving switch arm 47 into engagement with terminal 39 and moving switch arm 41 successively to its various positions. Resistor 43 provides a standardizing resistance whereby the circuits may be compensated for battery depletion or changes in voltages supplied to the constant current tubes. With resistors 43 and 44 in the circuit, the recorder is recalibrated to represent the pressure equivalent to the combined resistance of units 43 and 44. In similar manner, the indicator or recorder is recalibrated for each of the pressures stored in the circuit by the initial adjustments of calibration resistors 43, 44 and 45.

It will be apparent that I have provided a pressure-indicating instrument suitable for use in inaccessible locations, and that the instrument may be readily recalibrated to compensate for aging of batteries, tubes or other circuit components without removing the pressure transducer from its inaccessible location. The circuit is sufficiently simple that it is economical for use in obtaining continuous pressure measurements within flowing wells, and the recalibration makes the circuit eminently suitable for this purpose.

While the invention has been described in connection with a present, preferred embodiment thereof, it is to be understood that this description is illustrative only and is not intended to limit the invention, the scope of which is defined by the appended claims.

I claim:

1. Pressure indicating apparatus for producing an impedance representative of the pressure in a well having tubing therein which comprises, in combination, a housing secured to the lower end of said tubing, a bellows carried by said housing, a movable member secured to said bellows, a spring for urging said bellows to an extended position, the well pressure urging said bellows to a collapsed position, a plurality of pivoted rods arranged to form a parallelogram, two opposite corners of said parallelogram being connected, respectively, to said housing and the movable member secured to said bellows, and a coil of resistance wire connected between the other opposite corners of said parallelogram, the resistance of said wire varying in accordance with the position of said bellows.

2. Impedance measuring apparatus comprising, a variable impedance element to be measured, a potentiometer, a first vacuum tube having at least an anode, a cathode, a control grid and a screen grid, a first variable resistor connected between the first end terminal of said impedance element and the cathode of said first tube, circuit means applying constant operating potentials to the remaining electrodes within said first tube whereby there is constant current through said impedance element, the second terminal of said impedance element being maintained at a point of fixed potential, a second vacuum tube having at least an anode, a cathode, a control grid and a screen grid, a second variable resistor connected between the first end terminal of said potentiometer and the cathode of said second tube, circuit means applying constant operating potentials to the remaining electrodes within said second tube whereby there is constant current through said potentiometer, the second end terminal of said potentiometer being maintained at said point of fixed potential, a reversible motor having the drive shaft thereof coupled to the contactor of said potentiometer, a current source for operating said motor, a polarized relay, said current source being connected to said motor through the contacts of said relay whereby said motor is rotated in a first direction when current of a first polarity is applied to the coil of said relay and in a second direction when current of opposite polarity is applied to the coil of said relay, a first lead connecting one terminal of said impedance element to one terminal of the coil of said relay, and a second lead connecting the contactor of said potentiometer to the second terminal of the coil of said relay whereby said motor is rotated to adjust the contactor of said potentiometer until there is zero potential difference between the contactor of said potentiometer and said one terminal of said impedance element.

3. The combination in accordance with claim 2 further comprising a calibrating impedance element and switching means to connect said calibrating element in circuit with said voltage comparing means in place of said first-mentioned impedance element.

4. Pressure measuring apparatus comprising a housing, a member flexibly secured to said housing for movement in a first direction responsive to pressure applied thereto, a spring extending between said member and said housing to urge said member in a second direction opposite said first direction, a plurality of rods pivotally secured to one another to form a quadrilateral, means connecting two opposite corners of said quadrilateral, respectively, to said housing and said member, and a coil of resistance wire connected between the other two opposite corners of said quadrilateral, the resistance of said wire varying in accordance with the position of said member.

5. The combination in accordance with claim 2 wherein said variable impedance element comprises a coil of resistance wire, a housing, a member flexibly secured to said housing for movement in a first direction responsive to pressure applied thereto, a spring extending between said member and said housing to urge said member in a second direction opposite said first direction, a plurality of rods pivotally secured to one another to form a parallelogram, means connecting two opposite corners of said parallelogram, respectively, to said housing and said member, and means connecting said coil of resistance wire between the other two opposite corners of said parallelogram, the resistance of said wire varying in accordance with the position of said member.

References Cited in the file of this patent

UNITED STATES PATENTS

| Number | Name | Date |
|---|---|---|
| 736,297 | Reed | Aug. 11, 1903 |
| 1,036,304 | Misland | Aug. 20, 1912 |
| 1,602,444 | Naiman | Oct. 12, 1926 |
| 1,681,314 | Vawter | Aug. 21, 1928 |
| 1,822,075 | Aronoff | Sept. 8, 1931 |
| 1,931,054 | Butterfield | Oct. 17, 1933 |
| 2,265,098 | Bettis | Dec. 2, 1941 |
| 2,359,334 | Smith | Oct. 3, 1944 |
| 2,423,609 | Middleton et al. | July 8, 1947 |
| 2,453,551 | Statham | Nov. 9, 1948 |
| 2,564,416 | Wildhack | Aug. 14, 1951 |
| 2,586,393 | Smith et al. | Feb. 19, 1952 |

OTHER REFERENCES

Publication, Instruments, H. C. Roberts, December 1944, pp. 742–744.

Nat. Bureau of Standards Technical Report No. 1286: Instruments, vol. 21, No. 10, October 1948, p. 880.